Sept. 14, 1954   J. J. WARMOES ET AL   2,688,884
DEVICE FOR ELASTICALLY TRANSFERRING FORCES
Filed April 17, 1952   2 Sheets-Sheet 1

INVENTORS:
JEAN JUSTIN WARMOES AND
LEON A.A.J. CLOSKIN
BY

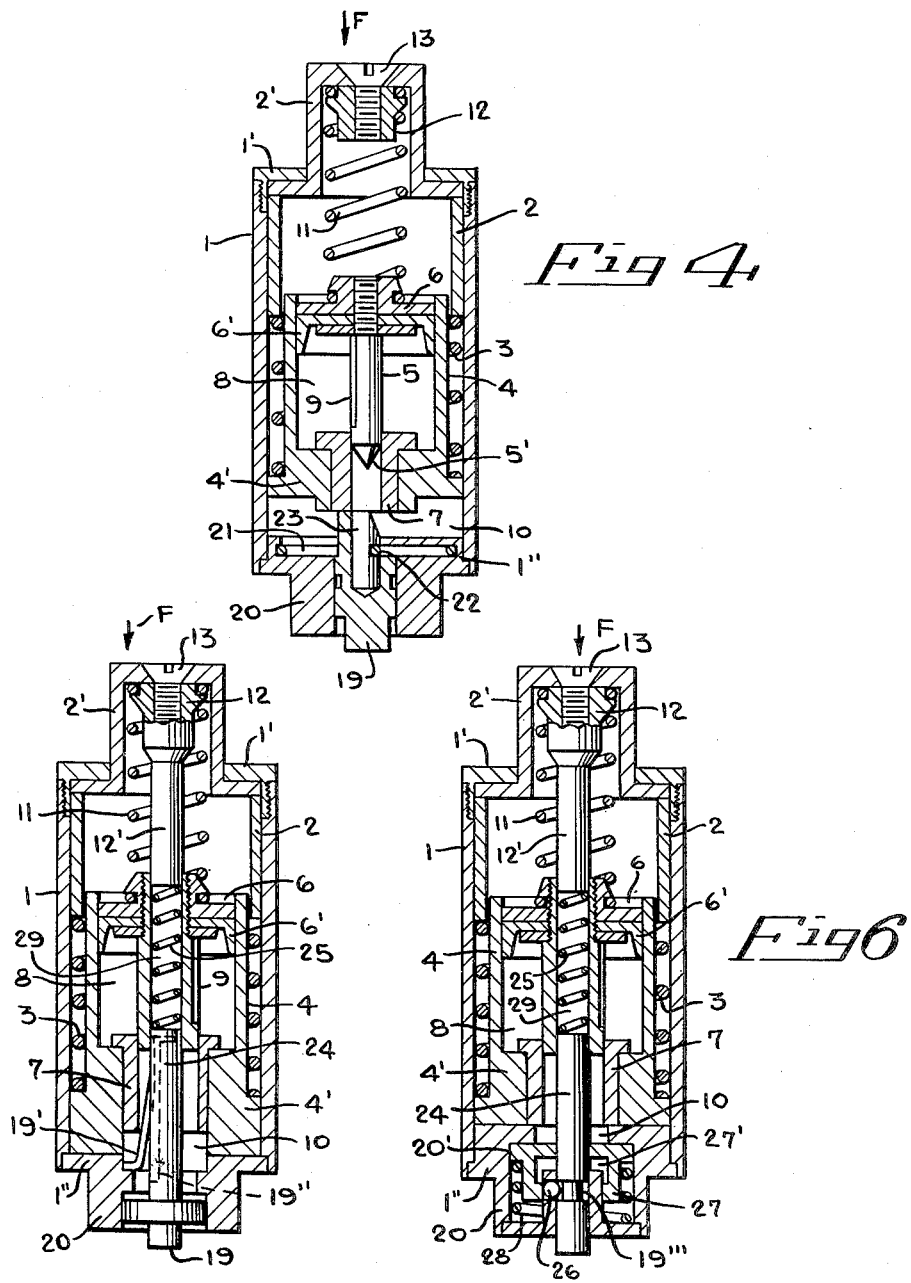

Patented Sept. 14, 1954

2,688,884

UNITED STATES PATENT OFFICE 2,688,884

DEVICE FOR ELASTICALLY TRANSFERRING FORCES

Jean Justin Warmoes, Montreal, Quebec, Canada, and Leon Auguste Adrien Joseph Closkin, Liege, Belgium Application April 17, 1952, Serial No. 282,882

Claims priority, application Belgium April 25, 1951

33 Claims. (Cl. 74—470)

1

The present invention relates to a device for transferring a force, and more particularly to a device for elastically transferring a force.

It is an object of the present invention to provide an intermediate member in a mechanical system transferring the effort of a force from one part to another.

It is another object of the present invention to provide an elastic force-transmitting device in systems in which at least part of the elements are subject to vehement forces.

It is a further object of the present invention to provide an intermediate device for mechanical systems involving forces acting very rapidly.

It is still another object of the present invention to provide a device of the type described in which the forces are initially retarded.

It is a still further object of the present invention to provide an intermediate part of a mechanical system in which the forces are transmitted with a certain delay.

A device for transferring a force according to the present invention comprises in its broadest aspect a cylinder containing a fluid, a piston arranged in the cylinder so as to cooperate therewith, the piston being driven by an external force so as to carry out a forward stroke and to compress during at least part of the same the fluid in the cylinder so that the latter has a braking effect on the piston, means operative in the last part of the forward stroke of the piston for relieving the pressure of the fluid in the cylinder, the pressure relieving means causing the braking effect of the fluid on the piston to end, and an element acted upon by the piston after the relief of the pressure of the fluid in the cylinder and the end of the braking effect of the same on the piston so as to transfer to the element at least part of the effort of the external force driving the piston with a delay caused by the braking effect of the fluid on the piston.

Preferably resilient means acting upon the piston impart to the same a sudden impulse after the relief of pressure of the fluid in the cylinder. Preferably the resilient means are inserted between a cylindrical head receiving the effort of the external force and the piston.

One embodiment of the present invention comprises a first cylinder forming one piece with the cylindrical head and having a wall sliding in the cylindrical casing, the first cylinder being open at one end thereof, a second cylinder extending through the open end of the first cylinder and having a wall being in sliding contact

2 with the inner surface of the wall of the first cylinder, the second cylinder containing a fluid, the piston being arranged in the second cylinder In one embodiment of the present invention the piston rod is rigidly connected to the piston, a sleeve rigidly connected to the cylinder surrounding part of the piston rod in fluid-tight manner and a channel is provided in the piston rod and has a length exceeding the length of the sleeve, the channel communicating with the interior of the cylinder in all positions of the piston and being closed by the sleeve except in the last part of the forward stroke of the piston.

In another embodiment of the present invention a groove is provided in the piston rod and extends longitudinally thereof, the groove having a length exceeding the length of the sleeve and terminating against the inner wall thereof except in the last part of the forward stroke of the piston.

Preferably a member is provided which temporarily locks the element, the member being released by the piston being imparted the sudden impulse.

Preferably the piston rod is hollow and engaged by a solid rod, resilient means being arranged in the hollow piston rod above the solid rod so as to urge the solid rod into one end position thereof, the solid rod in the one end position thereof relieving a member temporarily locking the element.

Preferably the resilient means arranged above the solid rod are abutting against the cylindrical head.

In one embodiment of the present invention the element is hollow and provided with a recess adapted for being engaged by the piston rod during the last part of the forward stroke of the piston, and the spring member, preferably the end portion of the spiral spring, engages the groove in the recess of the element so as to lock the same, the spring member being shifted by the piston rod, preferably by a conically shaped end portion thereof, from the groove engaging position into a position unlocking the element.

In another embodiment of the present invention the solid rod is provided with a longitudinal groove in which resilient means are arranged such as the end of a resilient rod the other end of which protrudes therefrom and is engaged by the casing thereby locking the solid rod against movement, the resilient rod being pressed by the hollow piston rod in the last part of the forward stroke of the piston into the longitudinal groove of the solid rod so as to unlock the same.

Another embodiment of the invention comprises means shiftably aranged inside the casing near the other of the end walls thereof, the shiftably arranged means surrounding the solid rod, resilient means inserted between the other end wall of the casing and the shiftably arranged means so as to hold the same in one end position thereof, and means cooperating with the shiftably arranged means for locking the solid rod against movement, the shiftably arranged means being shifted into the other end position thereof by the hollow piston rod during the last part of the forward stroke of the piston, whereby the solid rod is unlocked and subjected to at least part of the effort of the external force driving the piston.

Preferably the shiftably arranged means are formed by a ring-shaped body having two flanges limiting a hollow chamber, and the locking means are formed by a ball normally arranged in a circumferential recess of the solid rod and entering the hollow chamber between two flanges of a ring-shaped body so as to unlock the solid rod.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 4 is a longitudinal section of the device shown in Fig. 3;

Fig. 5 is a longitudinal section through a third embodiment of the present invention; and Fig. 6 is a similar longitudinal section of a fourth embodiment of the present invention.

Figure 1:
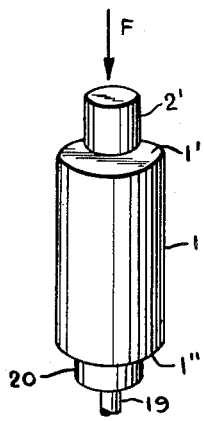
Fig. 1 is a perspective view of a first embodiment of the present invention.
Figure 2:
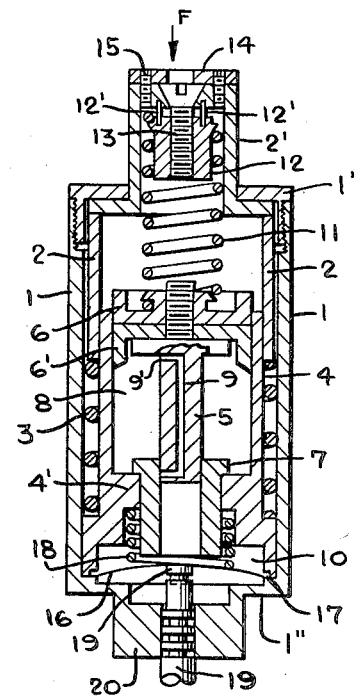
Fig. 2 is a longitudinal section of the device shown in Fig. 1.

Referring now to the drawings and first to Figs. 1 and 2, the device comprises a preferably cylindrical casing 1 which can be formed by several sections. The cylindrical casing 1 has an upper end wall 1' and a lower end wall 1" at least one of which is connected by a screwed flange with the curved wall of the cylindrical casing 1. The end wall 1' is provided with a hole through which a cylindrical head 2' rigidly connected to a cylinder 2 extends so that it projects outside the cylindrical casing 1. The cylinder 2 is in slidable contact with the inner walls of the cylindrical casing 1 and has to this end preferably an outer diameter which is approximately equal to the inner diameter of the cylindrical casing 1. In contradistinction thereto the outer diameter of the cylindrical head 2' is considerably smaller than the diameter of the cylinder 2 and equals approximately the diameter of the circular hole of the end wall 1'.

The unit formed by the cylinder 2 and the cylindrical head 2' is pressed against the end wall 1' by a resilient intermediate member for instance a helical spring 3 which abuts either directly against the other end wall 1" or as shown in the drawing against a piece such as 4' rigidly connected to the cylindrical casing 1 or its end wall 1". When the cylinder 2 is displaced it slides between two walls the outer one of which is formed by the cylindrical casing 1 and the inner one of which is formed by a cylinder 4 which is preferably coaxial with the cylindrical casing 1. The cylinder 4 rests with its base portion 4' on the end wall 1" of the cylindrical casing 1 and can, if desired, be connected with the same by any other means.

The base portion 4' of the cylinder 4 is hollow and rigidly connected to a sleeve 7 in which the piston rod 5 of piston 6 slides. The piston 6 is provided with a gland 6' forming an air-tight connection with the walls of the cylinder 4 so that the air or fluid contained in the chamber 8 formed by the cylinder 4 and piston 6 cannot escape from the same and is compressed as long as the outlet formed by the channel 9 in the piston rod 5 is not open. The channel 9 has an upper horizontal part 9' communicating in all positions of the piston with the chamber 8 and a lower horizontal part 9" which is as a rule, closed by the interior wall of the sleeve 7 which, however, is shorter than the channel 9 so that in the lowermost position of the piston 6, i. e. at the last part of the forward stroke of the piston 6, the chamber 8 is put into communication with the chamber 10 formed in the lowermost part of the cylindrical casing 1. If desired, the air can escape to the atmosphere from the chamber 10.

The movements of the piston 6 are controlled by the cylindrical head 2' by means of a resilient member such as a compression spring 11 which abuts with the lower end thereof against the piston 6 whereas the upper end of the spring 11 is attached to a nut 12 of a screw 13 which is held immovably in the cylindrical head 2' by a lid 14 or the like. The rotation of the nut 12 is prevented by pins 12' or the like. The connection of the lid 14 with the cylindrical head 2' and the head of the screw 13 can be controlled by means of screws 15 so that if desired the screw 13 can be sufficiently loosened for giving it a rotation in one or the other direction. A rotation of the screw 13 modifies the distance between the nut 12 and the cylindrical head 2' and therefore the tension of the spring 11.

The operation of this device is as follows:

When an effort F is applied to the cylindrical head 2' the same is transferred to the piston 6 with a certain retardation and a certain deadening effect due to the springs 3 and 11. The air contained in the chamber 8 is compressed so as to exert a braking effect on the piston 6, until the part 9" of the channel 9 in the piston rod 5 puts the chamber 8 in communication with the chamber 10. At that moment the compressed air is expanded so that the braking effect on the piston 6 is ended and the piston 6 and the piston rod 5 continue their path under the pressure of the spring 11. Owing to the motion of the piston 6 and the piston rod 5 in the direction of the initial effort F the latter is transmitted either directly or through any mechanical or electrical relay. The effort F thus acts with a deadening and a retardation which can be adjusted at will by adjusting the parts of the device.

The piston rod 5 acts preferably on a snapping spring 16 having the shape of a sheet or plate arranged with the edge portion thereof in a groove 17 in the curved wall of the chamber 10 so as to turn its convex side toward the piston rod 5. During the descent of the piston rod 5 the same comes into contact with the spring 16 and exerts on the same a pushing force which deforms the spring 16 until the latter snaps suddenly into a position in which it turns the convexity thereof downwards. The action of the piston rod 5 on the spring 16 can be reinforced by means of a spring 18 arranged between the base portion 4' of the cylinder 4 and the spring 16. Preferably a rod 19 is connected to the spring 16 and guided in a sleeve 20 forming one piece with the end wall 1'' of the cylindrical casing 1. The kinetic energy transferred in this way to the rod 19 is finally used in any manner (not shown in the drawings).

Figure 3:
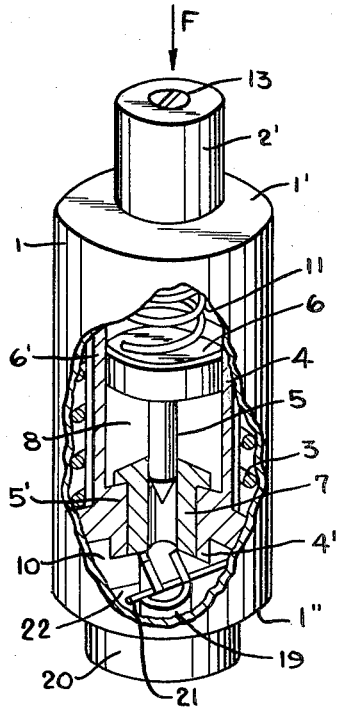
Fig. 3 is a perspective view of a second embodiment of the present invention, part of the front wall being broken away in order to show the interior of the device.

Referring now to Figs. 3 and 4 of the drawings, the piston rod is provided with a groove 9 instead of a channel. Furthermore, the cylinder 4 is movably arranged within the cylindrical casing 1 and is supported by the element 19 which is temporarily locked in position by resilient means such as the end portion 21 of a spiral spring which engages a groove 22 in a recess 23 of the element 19. The end portion 21 is normally arranged in the groove 22 which is eccentrical with respect to the longitudinal axis of the piston rod 5 provided with a conically shaped end portion 5'.

The operation of this device is substantially the same as that shown in Figs. 1 and 2 with the modification that the chamber 8 is put into communication with a chamber 10 by the groove 9 instead of a channel and that the piston rod 5 can enter the recess 23 of the solid rod 19 thereby shifting the end portion 21 of the spiral spring by means of the conically shaped end portion 5' so as to cause the same to leave the groove 22 so that the solid rod or element 19 is unlocked and driven by the motion of the cylinder 4.

Referring now to Figs. 5 and 6 showing two further embodiments of the present invention it will be seen that the piston rod 5 is made hollow, the hollow of the piston rod 5 being slidably engaged at the upper end thereof by an extension 12' of the nut 12. The lower end of the hollow of the piston rod 5 is engaged by the solid rod 19 and a compression spring 25 is arranged in the space 29 within the hollow piston rod 5 between the extension 12' and the solid rod 19. In both embodiments the solid rod is locked against motion as long as the piston rod 5 has not descended far enough for putting the chamber 8 in communication with the chamber 10 by means of the groove 9.

According to the embodiment shown in Fig. 5 the solid rod 19 is provided with a longitudinal groove 19'' extending in the upper part 24 of the solid rod or element 19. A resilient rod 19' is secured with the upper end thereof to the groove 19'' and protrudes with the other end from the longitudinal groove 19'' so as to be engaged by the sleeve 20 forming one piece with the lower end wall 1'' of the cylindrical casing 1.

The operation of this device is substantially the same as that shown in Figs. 3 and 4 except that the solid rod 19 is locked by the resilient rod 19' engaging the sleeve 20. When the hollow piston rod 5 has descended sufficiently far it presses the body of the resilient rod 19' into the groove 19'' so that the end of the resilient rod 19' leaves the locking position thereof, the solid rod 19 being now free for moving under the effort F which is transferred to the solid rod 19 by means of the helical springs 11 and 25.

Referring now to Fig. 6 the locking of the solid rod 19 is effected by a ball 26 engaging at least partly a recess 19''' in the curved wall of the solid rod 19. The ball 26 is held in locking position by a ring-shaped body 27 having two flanges limiting a hollow chamber 27'. The ring-shaped body 27 is acted upon by a compression spring 28 urging the same into ball-locking position.

The operation of this device is the same as that of Fig. 5 except that the hollow piston rod 5 in the last part of the forward stroke of the piston 6 comes into contact with the upper end face of the ring-shaped body 27 and shifts the same against the force of the compression spring 28 downwards whereby the ball 26 is released from the position in which it locks the solid rod 19 and enters the lower part of the hollow chamber 27'.

It should be understood that the resilient means shown in the drawings as helical springs could be replaced, if desired by other resilient means and that the same serve for returning the parts of the device into the initial positions thereof shown in the drawings after the effort F has ceased.

It will be understood that each of the elements described above, or two or more together, may also find a useful application in other types of devices for transferring a force differing from the types described above.

While the invention has been illustrated and described as embodied in a device for elastically transferring a force, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A device for transferring a force, comprising, in combination, a cylindrical casing; a cylindrical head protruding outside said casing and receiving the effort of an external force; a first cylinder forming one piece with said cylindrical head and having a wall sliding in said cylindrical casing, said first cylinder being open at one end thereof; a second cylinder extending through said open end of said first cylinder and having a wall being in sliding contact with the inner surface of said wall of said first cylinder, said second cylinder containing a fluid; a piston arranged in said second cylinder so as to cooperate therewith; resilient means inserted between said cylindrical head and said piston so as to drive the same by the effort of the external force so as to carry out a forward stroke and to compress during at least part of the same the fluid in said second cylinder so that the latter has a braking effect on said piston; means operative in the last part of the forward stroke of said piston for relieving the pressure of the fluid in said second cylinder, said pressure relieving means causing the braking effect of the fluid on said piston to end; and an element acted upon by said piston after the relief of the pressure of the fluid in said second cylinder and the end of the braking effect of the same on said piston so as to transfer to said element at least part of the effort of the external force driving said piston with a delay caused by the braking effect of the fluid on said piston, said resilient means imparting to said piston a sudden impulse after the relief of the pressure of the fluid in said second cylinder.

2. A device for transferring a force, comprising, in combination, a cylindrical casing; a cylindrical head protruding outside said casing and receiving the effort of an external force; a first cylinder forming one piece with said cylindrical head and having a wall sliding in said cylindrical casing, said first cylinder being open at one end thereof; first resilient means inserted in said cylindrical casing and abutting against the lower edge of said open end of said first cylinder; a second cylinder extending through said open end of said first cylinder and having a wall being in sliding contact with the inner surface of said wall of said first cylinder, said second cylinder containing a fluid; a piston arranged in said second cylinder so as to cooperate therewith; second resilient means inserted between said cylindrical head and said piston so as to drive the same by the effort of the external force so as to carry out a forward stroke and to compress during at least part of the same the fluid in said second cylinder so that the latter has a braking effect on said piston; means operative in the last part of the forward stroke of said piston for relieving the pressure of the fluid in said second cylinder, said pressure relieving means causing the braking effect of the fluid on said piston to end; and an element acted upon by said piston after the relief of the pressure of the fluid in said second cylinder and the end of the braking effect of the same on said piston so as to transfer to said element at least part of the effort of the external force driving said piston with a delay caused by the braking effect of the fluid on said piston, said second resilient means imparting to said piston a sudden impulse after the relief of the pressure of the fluid in said second cylinder.

3. A device for transferring a force, comprising, in combination, a cylinder containing a fluid; a piston arranged in said cylinder so as to cooperate therewith, said piston being driven by an external force so as to carry out a forward stroke and to compress during at least part of the same the fluid in said cylinder so that the latter has a braking effect on said piston; a piston rod rigidly connected to said piston; a sleeve rigidly connected to said cylinder and surrounding part of said piston rod in a fluid-tight manner; a channel provided in said piston rod and having a length exceeding the length of said sleeve, said channel communicating with the interior of said cylinder in all positions of said piston and being closed by said sleeve except in the last part of the forward stroke of said piston so as to relieve the pressure of the fluid in said cylinder and to cause the braking effect of the fluid on said piston to end; and an element acted upon by said piston after the relief of the pressure of the fluid in said cylinder and the end of the braking effect of the same on said piston so as to transfer to said element at least part of the effort of the external force driving said piston with a delay caused by the braking effect of the fluid on said piston.

4. A device for transferring a force, comprising, in combination, a cylinder containing a fluid; a piston arranged in said cylinder so as to cooperate therewith; resilient means acting upon said piston, said piston being driven by an external force so as to carry out a forward stroke and to compress during at least part of the same the fluid in said cylinder so that the latter has a braking effect on said piston; a piston rod rigidly connected to said piston; a sleeve rigidly connected to said cylinder and surrounding part of said piston rod in a fluid-tight manner; a channel provided in said piston rod and having a length exceeding the length of said sleeve, said channel communicating with the interior of said cylinder in all positions of said piston and being closed by said sleeve except in the last part of the forward stroke of said piston so as to relieve the pressure of the fluid in said cylinder and to cause the braking effect of the fluid on said piston to end; and an element acted upon by said piston after the relief of the pressure of the fluid in said cylinder and the end of the braking effect of the same on said piston so as to transfer to said element at least part of the effort of the external force driving said piston with a delay caused by the braking effect of the fluid on said piston.

5. A device for transferring a force, comprising, in combination, a cylindrical head receiving the effort of an external force; a cylinder containing a fluid; a piston arranged in said cylinder so as to cooperate therewith; resilient means inserted between said cylindrical head and said piston so as to drive the same by the effort of the external force so as to carry out a forward stroke and to compress during at least part of the same the fluid in said cylinder so that the latter has a braking effect on said piston; a piston rod rigidly connected to said piston; a sleeve rigidly connected to said cylinder and surrounding part of said piston rod in a fluid-tight manner; a channel provided in said piston rod and having a length exceeding the length of said sleeve, said channel communicating with the interior of said cylinder in all positions of said piston and being closed by said sleeve except in the last part of the forward stroke of said piston so as to relieve the pressure of the fluid in said cylinder and to cause the braking effect of the fluid on said piston to end; and an element acted upon by said piston after the relief of the pressure of the fluid in said cylinder and the end of the braking effect of the same on said piston so as to transfer to said element at least part of the effort of the external force driving said piston with a delay caused by the braking effect of the fluid on said piston.

6. A device for transferring a force, comprising, in combination, a cylindrical casing; a cylindrical head protruding outside said casing and receiving the effort of an external force; a first cylinder forming one piece with said cylindrical head and having a wall sliding in said cylindrical casing, said first cylinder being open at one end thereof; a second cylinder extending through said open end of said first cylinder and having a wall being in sliding contact with the inner surface of said wall of said first cylinder, said second cylinder containing a fluid; a piston arranged in said second cylinder so as to cooperate therewith; resilient means inserted between said cylindrical head and said piston so as to drive the same by the effort of the external force so as to carry out a forward stroke and to compress during at least part of the same the fluid in said second cylinder so that the latter has a braking effect on said piston; a piston rod rigidly connected to said piston; a sleeve rigidly connected to said second cylinder and surrounding part of said piston rod in a fluid-tight manner; a channel provided in said piston rod and having a length exceeding the length of said sleeve, said channel communicating with the interior of said second cylinder in all positions of said piston and being closed by said sleeve except in the last part of the forward stroke of said piston so as relieve the pressure of the fluid in said second cylinder and to cause the braking effect of the fluid on said piston to end;

and an element acted upon by said piston after the relief of the pressure of the fluid in said second cylinder and the end of the braking effect of the same on said piston so as to transfer to said element at least part of the effort of the external force driving said piston with a delay caused by the braking effect of the fluid on said piston.

7. A device for transferring a force, comprising, in combination, a cylinder containing a fluid; a piston arranged in said cylinder so as to cooperate therewith, said piston being driven by an external force so as to carry out a forward stroke and to compress during at least part of the same the fluid in said cylinder so that the latter has a braking effect on said piston; a piston rod rigidly connected to said piston; a sleeve rigidly connected to said cylinder and surrounding part of said piston rod in a fluid-tight manner; a channel provided in said piston rod and having a length exceeding the length of said sleeve, said channel communicating with the interior of said cylinder in all positions of said piston and being closed by said sleeve except in the last part of the forward stroke of said piston so as to relieve the pressure of the fluid in said cylinder and to cause the braking effect of the fluid on said piston to end; a spring arranged on the side of said sleeve opposite to said piston, said spring being acted upon by said piston rod so as to receive a sudden shock from the same when the compressed fluid leaves said cylinder through said channel; and means acted upon by said spring, said means receiving at least part of the effort of the external force driving said piston with a delay caused by the braking effect of the fluid on said piston.

8. A device for transferring a force, comprising, in combination, a cylindrical casing; a cylindrical head protruding outside said casing and receiving the effort of an external force; a first cylinder forming one piece with said cylindrical head and having a wall sliding in said cylindrical casing, said first cylinder being open at one end thereof; a second cylinder extending through said open end of said first cylinder and having a wall being in sliding contact with the inner surface of said wall of said first cylinder, said second cylinder containing a fluid; a piston arranged in said second cylinder so as to cooperate therewith; resilient means inserted between said cylindrical head and said piston so as to drive the same by the effort of the external force so as to carry out a forward stroke and to compress during at least part of the same the fluid in said second cylinder so that the latter has a braking effect on said piston; a piston rod rigidly connected to said piston; a sleeve rigidly connected to said second cylinder and surrounding part of said piston rod in a fluid-tight manner; a channel provided in said piston rod and having a length exceeding the length of said sleeve, said channel communicating with the interior of said second cylinder in all positions of said piston and being closed by said sleeve except in the last part of the forward stroke of said piston so as to relieve the pressure of the fluid in said second cylinder and to cause the braking effect of the fluid on said piston to end; a plate spring arranged in said cylindrical casing on the side of said sleeve opposite to said piston, said spring being acted upon by said piston rod so as to receive a sudden shock from the same when the compressed fluid leaves said second cylinder through said channel; and means acted upon by said spring, said means receiving at least part of the effort of the external force driving said piston with a delay caused by the braking effect of the fluid on said piston.

9. A device for transferring a force, comprising, in combination, a cylindrical casing; a cylindrical head protruding outside said casing and receiving the effort of an external force; a first cylinder forming one piece with said cylindrical head and having a wall sliding in said cylindrical casing, said first cylinder being open at one end thereof; a second cylinder extending through said open end of said first cylinder and having a wall being in sliding contact with the inner surface of said wall of said first cylinder, said second cylinder containing a fluid; a piston arranged in said second cylinder so as to cooperate therewith; resilient means inserted between said cylindrical head and said piston so as to drive the same by the effort of the external force so as to carry out a forward stroke and to compress during at least part of the same the fluid in said second cylinder so that the latter has a braking effect on said piston; a piston rod rigidly connected to said piston; a sleeve rigidly connected to said second cylinder and surrounding part of said piston rod in a fluid-tight manner; a channel provided in said piston rod and having a length exceeding the length of said sleeve, said channel communicating with the interior of said second cylinder in all positions of said piston and being closed by said sleeve except in the last part of the forward stroke of said piston so as to relieve the pressure of the fluid in said second cylinder and to cause the braking effect of the fluid on said piston to end; a plate spring arranged in said cylindrical casing on the side of said sleeve opposite to said piston, said spring being acted upon by said piston rod so as to receive a sudden shock from the same when the compressed fluid leaves said second cylinder through said channel; and a rod acted upon by said plate spring, said rod receiving at least part of the effort of the external force driving said piston with a delay caused by the braking effect of the fluid on said piston.

10. A device for transferring a force, comprising, in combination, a cylindrical casing; a cylindrical head protruding outside said casing and receiving the effort of an external force; a first cylinder forming one piece with said cylindrical head and having a wall sliding in said cylindrical casing, said first cylinder being open at one end thereof; a second cylinder extending through said open end of said first cylinder and having a wall being in sliding contact with the inner surface of said wall of said first cylinder, said second cylinder containing a fluid; a piston arranged in said second cylinder so as to cooperate therewith; resilient means inserted between said cylindrical head and said piston so as to drive the same by the effort of the external force so as to carry out a forward stroke and to compress during at least part of the same the fluid in said second cylinder so that the latter has a braking effect on said piston; a piston rod rigidly connected to said piston; a sleeve rigidly connected to second cylinder and surrounding part of said piston rod in a fluid-tight manner; a channel provided in said piston rod and having a length exceeding the length of said sleeve, said channel communicating with the interior of said second cylinder in all positions of said piston and being closed by said sleeve except in the last part of the forward stroke of said piston so as to relieve the pressure of the fluid in said second cylinder and to cause the braking effect of the fluid on said piston to end; a plate spring arranged in said cylindrical casing on the side of said sleeve opposite to said piston, said spring being acted upon by said piston rod so as to receive a sudden shock from the same when the compressed fluid leaves said second cylinder through said channel; a rod acted upon by said plate spring, said rod receiving at least part of the effort of the external force driving said piston with a delay caused by the braking effect of the fluid on said piston; and a resilient element inserted between said second cylinder and said plate spring, said resilient element reinforcing the action of said piston rod on said plate spring.

11. A device for transferring a force, comprising, in combination, a cylindrical casing; a cylindrical head protruding outside said casing and receiving the effort of an external force; a first cylinder forming one piece with said cylindrical head and having a wall sliding in said cylindrical casing, said first cylinder being open at one end thereof; a second cylinder extending through said open end of said first cylinder and having a wall being in sliding contact with the inner surface of said wall of said first cylinder, said second cylinder containing a fluid; a piston arranged in said second cylinder so as to cooperate therewith; resilient means inserted between said cylindrical head and said piston so as to drive the same by the effort of the external force so as to carry out a forward stroke and to compress during at least part of the same the fluid in said second cylinder so that the latter has a braking effect on said piston; a piston rod rigidly connected to said piston; a sleeve rigidly connected to said second cylinder and surrounding part of said piston rod in a fluid-tight manner; a channel provided in said piston rod and having a length exceeding the length of said sleeve, said channel communicating with the interior of said second cylinder in all positions of said piston and being closed by said sleeve except in the last part of the forward stroke of said piston so as to relieve the pressure of the fluid in said second cylinder and to cause the braking effect of the fluid on said piston to end; a plate spring having a marginal portion abutting against one end of said cylindrical casing, said plate spring being arranged on the side of said sleeve opposite to said piston, said spring being acted upon by said piston rod so as to receive a sudden shock from the same when the compressed fluid leaves said second cylinder through said channel; and means acted upon by said spring, said means receiving at least part of the effort of the external force driving said piston with a delay caused by the braking effect of the fluid on said piston.

12. A device for transferring a force, comprising, in combination, a cylindrical casing; a cylindrical head protruding outside said casing and receiving the effort of an external force; a first cylinder forming one piece with said cylindrical head and having a wall sliding in said cylindrical casing, said first cylinder being open at one end thereof; first resilient means inserted in said cylindrical casing and abutting against the lower edge of said open end of said first cylinder; a second cylinder extending through said open end of said first cylinder and having a wall being in sliding contact with the inner surface of said wall of said first cylinder, said second cylinder having a part being in contact with said cylindrical casing and abutting against said first resilient means, said second cylinder containing a fluid; a piston arranged in said second cylinder so as to cooperate therewith; second resilient means inserted between said cylindrical head and said piston so as to drive the same by the effort of the external force so as to carry out a forward stroke and to compress during at least part of the same the fluid in said second cylinder so that the latter has a braking effect on said piston; means operative in the last part of the forward stroke of said piston for relieving the pressure of the fluid in said second cylinder, said pressure relieving means causing the braking effect of the fluid on said piston to end; and an element acted upon by said piston after the relief of the pressure of the fluid in said second cylinder and the end of the braking effect of the same on said piston so as to transfer to said element at least part of the effort of the external force driving said piston with a delay caused by the braking effect of the fluid on said piston.

13. A device for transferring a force, comprising, in combination, a cylinder containing a fluid; a piston arranged in said cylinder so as to cooperate therewith, said piston being driven by an external force so as to carry out a forward stroke and to compress during at least part of the same the fluid in said cylinder so that the latter has a braking effect on said piston; a piston rod rigidly connected to said piston; a sleeve rigidly connected to said cylinder and surrounding part of said piston rod in a fluid-tight manner; a groove provided in said piston rod and extending longitudinally thereof, said groove having a length exceeding the length of said sleeve, said groove communicating with the interior of said cylinder in all positions of said piston and terminating against the inner walls of said sleeve except in the last part of the forward stroke of said piston so as to relieve the pressure of the fluid in said cylinder and to cause the braking effect of the fluid on said piston to end; and an element acted upon by said piston after the relief of the pressure of the fluid in said cylinder and the end of the braking effect of the same on said piston so as to transfer to said element at least part of the effort of the external force driving said piston with a delay caused by the braking effect of the fluid on said piston.

14. A device for transferring a force, comprising, in combination, a cylinder containing a fluid; a piston arranged in said cylinder so as to cooperate therewith; resilient means acting upon said piston so as to drive the same by an external force so as to carry out a forward stroke and to compress during at least part of the same the fluid in said cylinder so that the latter has a braking effect on said piston; means operative in the last part of the forward stroke of said piston for relieving the pressure of the fluid in said cylinder, said pressure relieving means causing the braking effect of the fluid on said piston to end; an element acted upon by said piston after the relief of the pressure of the fluid in said cylinder and the end of the braking effect of the same on said piston so as to transfer to said element at least part of the effort of the external force driving said piston with a delay caused by the braking effect of the fluid on said piston, said resilient means imparting to said piston a sudden impulse after the relief of the pressure of the fluid in said cylinder; and a member temporarily locked by said element, said member being released by said element when acted upon by said piston being imparted by the sudden impulse.

15. A device for transferring a force, comprising, in combination, a cylindrical member casing; a cylinder movably arranged in said cylindrical casing and containing a fluid; a piston member arranged in said cylinder member so as to cooperate therewith; resilient means acting upon said piston member so as to drive the same by an external force so as to carry out a forward stroke and to compress during at least part of the same the fluid in said cylinder member so that the latter has a braking effect on said piston member; means operative in the last part of the forward stroke of said piston member for relieving the pressure of the fluid in said cylinder member, said pressure relieving means causing the braking effect of the fluid on said piston member to end; an element acted upon by one of said members after the relief of the pressure of the fluid in said cylinder member and the end of the braking effect of the same on said piston member so as to transfer to said element through said cylinder member at least part of the effort of the external force driving said piston member with a delay caused by the braking effect of the fluid on said piston member, said resilient means imparting to said piston member a sudden impulse after the relief of the pressure of the fluid in said cylinder member; and an actuated member temporarily locked by said element, said actuated member being released by said element when acted upon by one of said members.

16. A device for transferring a force, comprising, in combination, a cylinder containing a fluid; a piston arranged in said cylinder so as to cooperate therewith, said piston being driven by an external force so as to carry out a forward stroke and to compress during at least part of the same the fluid in said cylinder so that the latter has a braking effect on said piston; a hollow piston rod rigidly connected to said piston; a sleeve surrounding part of said piston rod in a fluid-tight manner; a groove provided in said piston rod and extending longitudinally thereof, said groove having a length exceeding the length of said sleeve, said groove communicating with the interior of said cylinder in all positions of said piston and terminating against the inner walls of said sleeve except in the last part of the forward stroke of said piston so as to relieve the pressure of the fluid in said cylinder and to cause the braking effect of the fluid on said piston to end; an element acted upon by said piston rod after the relief of the pressure of the fluid in said cylinder and the end of the braking effect of the same on said piston so as to transfer to said element at least part of the effort of the external force driving said piston with a delay caused by the braking effect of the fluid on said piston; a solid rod slidingly arranged in said hollow piston rod and temporarily locked by said element; and resilient means arranged in said hollow piston rod above said solid rod so as to urge said solid rod into one end position thereof, said solid rod being released by said element in said one end position thereof when said element is acted upon by said piston rod.

17. A device for transferring a force, comprising, in combination, a casing having an end wall provided with a hole; a cylindrical head arranged partly inside said casing and protruding through the hole in said end wall thereof, said cylindrical head receiving the effort of an external force; a cylinder arranged in said casing and containing a fluid; a piston arranged in said cylinder so as to cooperate therewith; first resilient means arranged between said cylindrical head and said piston and transferring the external force from said cylindrical head to said piston so that the same carries out a forward stroke and compresses during at least part of the same the fluid in said cylinder so that the latter has a braking effect on said piston; a hollow piston rod rigidly connected to said piston; a sleeve surrounding part of said piston rod in a fluid-tight manner; a groove provided in said piston rod and extending longitudinally thereof, said groove having a length exceeding the length of said sleeve, said groove communicating with the interior of said cylinder in all positions of said piston and terminating against the inner walls of said sleeve except in the last part of the forward stroke of said piston so as to relieve the pressure of the fluid in said cylinder and to cause the braking effect of the fluid on said piston to end; an element acted upon by said piston rod after the relief of the pressure of the fluid in said cylinder and the end of the braking effect of the same on said piston so as to transfer to said element at least part of the effort of the external force driving said piston with a delay caused by the braking effect of the fluid on said piston; a solid rod slidingly arranged in said hollow piston rod and temporarily locked by said element; and second resilient means arranged in said hollow piston rod above said solid rod and abutting against said cylindrical head so as to urge said solid rod into one end position thereof, said solid rod being released by said element in said one end position thereof when said element is acted upon by said piston rod.

18. A device for transferring a force, comprising, in combination, a casing having an end wall provided with a hole; a cylindrical head arranged partly inside said casing and protruding through the hole in said end wall thereof, said cylindrical head receiving the effort of an external force; a cylinder arranged in said casing and containing a fluid; a piston arranged in said cylinder so as to cooperate therewith; first resilient means arranged between said cylindrical head and said piston and transferring the external force from said cylindrical head to said piston so that the same carries out a forward stroke and compresses during at least part of the same the fluid in said cylinder so that the latter has a braking effect on said piston; a hollow piston rod rigidly connected to said piston; a sleeve surrounding part of said piston rod in a fluid-tight manner; a groove provided in said piston rod and extending longitudinally thereof, said groove having a length exceeding the length of said sleeve, said groove communicating with the interior of said cylinder in all positions of said piston and terminating against the inner walls of said sleeve except in the last part of the forward stroke of said piston so as to relieve the pressure of the fluid in said cylinder and to cause the braking effect of the fluid on said piston to end; an element acted upon by said piston rod after the relief of the pressure of the fluid in said cylinder and the end of the braking effect of the same on said piston so as to transfer to said element at least part of the effort of the external force driving said piston with a delay caused by the braking effect of the fluid on said piston; a solid rod slidingly arranged in said hollow piston and temporarily locked by said element; an extension rigidly secured to said cylindrical head and extending into said hollow piston rod; and second resilient means arranged in said hollow piston rod between said extension and said solid rod so as to urge said solid rod into one end position thereof, said solid rod being released by said element in said one end position thereof when said element is acted upon by said piston rod.

19. A device for transferring a force, comprising, in combination, a cylindrical casing; a cylinder movably arranged in said casing and containing a fluid; a piston arranged in said cylinder so as to cooperate therewith, said piston being driven by an external force so as to carry out a forward stroke and to compress during at least part of the same the fluid in said cylinder so that the latter has a braking effect on said piston; a piston rod rigidly connected to said piston; a sleeve rigidly connected to said cylinder and surrounding part of said piston rod in a fluid-tight manner; a groove provided in said piston rod and extending longitudinally thereof, said groove having a length exceeding the length of said sleeve, said groove communicating with the interior of said cylinder in all positions of said piston and terminating against the inner walls of said sleeve except in the last part of the forward stroke of said piston so as to relieve the pressure of the fluid in said cylinder and to cause the braking effect of the fluid on said piston to end; a hollow element abutting against said sleeve and acted upon by said cylinder after the relief of the pressure of the fluid in said cylinder and the end of the braking effect of the same on said piston so as to transfer to said element at least part of the effort of the external force driving said piston with a delay caused by the braking effect of the fluid on said piston; a recess in said hollow element, said recess being adapted for being engaged by said piston rod during the last part of the forward stroke of said piston; and a spring member engaging a groove in said recess of said element so as to lock the same, said spring member being shifted by said piston rod from the groove engaging position into a position unlocking said element.

20. A device for transferring a force, comprising, in combination, a cylindrical casing; a cylinder movably arranged in said casing and containing a fluid; a piston arranged in said cylinder so as to cooperate therewith, said piston being driven by an external force so as to carry out a forward stroke and to compress during at least part of the same the fluid in said cylinder so that the latter has a braking effect on said piston; a piston rod rigidly connected to said piston; a sleeve rigidly connected to said cylinder and surrounding part of said piston rod in a fluid-tight manner; a groove provided in said piston rod and extending longitudinally thereof, said groove having a length exceeding the length of said sleeve, said groove communicating with the interior of said cylinder in all positions of said piston and terminating against the inner walls of said sleeve except in the last part of the forward stroke of said piston so as to relieve the pressure of the fluid in said cylinder and to cause the braking effect of the fluid on said piston to end; a hollow element abutting against said sleeve and acted upon by said cylinder after the relief of the pressure of the fluid in said cylinder and the end of the braking effect of the same on said piston so as to transfer to said element at least part of the effort of the external force driving said piston with a delay caused by the braking effect of the fluid on said piston; a recess in said hollow element, said recess being adapted for being engaged by said piston rod during the last part of the forward stroke of said piston; and a spiral spring having an end portion engaging a groove in said recess of said element so as to lock the same, said end portion of said spiral spring being shifted by said piston rod from the groove engaging position into a position unlocking said element.

21. A device for transferring a force, comprising, in combination, a cylindrical casing, a cylinder movably arranged in said casing and containing a fluid; a piston arranged in said cylinder so as to cooperate therewith, said piston being driven by an external force so as to carry out a forward stroke and to compress during at least part of the same the fluid in said cylinder so that the latter has a braking effect on said piston; a piston rod rigidly connected to said piston and having a conically shaped end portion; a sleeve rigidly connected to said cylinder and surrounding part of said piston rod in a fluid-tight manner; a groove provided in said piston rod and extending longitudinally thereof, said groove having a length exceeding the length of said sleeve, said groove communicating with the interior of said cylinder in all positions of said piston and terminating against the inner walls of said sleeve except in the last part of the forward stroke of said piston so as to relieve the pressure of the fluid in said cylinder and to cause the braking effect of the fluid on said piston to end; a hollow element abutting against said sleeve and acted upon by said cylinder after the relief of the pressure of the fluid in said cylinder and the end of the braking effect of the same on said piston so as to transfer to said element at least part of the effort of the external force driving said piston with a delay caused by the braking effect of the fluid on said piston; a recess in said hollow element, said recess being adapted for being engaged by said piston rod during the last part of the forward stroke of said piston; and a spiral spring having an end portion engaging a groove in said recess of said element so as to lock the same, said end portion of said spiral spring being shifted by said conical end portion of said piston rod from the groove engaging position into a position unlocking said element, said groove being arranged eccentrically with respect to the axis of said piston rod and the conically shaped end portion thereof.

22. A device for transferring a force, comprising, in combination, a cylindrical casing; a cylinder movably arranged in said casing and containing a fluid; a piston arranged in said cylinder so as to cooperate therewith, said piston being driven by an external force so as to carry out a forward stroke and to compress during at least part of the same the fluid in said cylinder so that the latter has a braking effect on said piston; a piston rod rigidly connected to said piston; a sleeve rigidly connected to said cylinder and surrounding part of said piston rod in a fluid-tight manner; a groove provided in said piston rod and extending longitudinally thereof, said groove having a length exceeding the length of said sleeve, said groove communicating with the interior of said cylinder in all positions of said piston and terminating against the inner walls of said sleeve except in the last part of the forward stroke of said piston so as to relieve the pressure of the fluid in said cylinder and to cause the braking effect of the fluid on said piston to end; a hollow element abutting against said sleeve and acted upon by said cylinder after the relief of the pressure of the fluid in said cylinder and the end of the braking effect of the same on said piston so as to transfer to said element at least part of the effort of the external force driving said piston with a delay caused by the braking effect of the fluid on said piston; a recess in said hollow element, said recess being adapted for being engaged by said piston rod during the last part of the forward stroke of said piston; and a spiral spring having an end portion engaging a groove in said recess of said element so as to lock the same, said end portion of said spiral spring being shifted by said piston rod from the groove engaging position into a position unlocking said element, said groove being arranged eccentrically with respect to the axis of said piston rod.

23. A device for transferring a force, comprising, in combination, a casing having an end wall provided with a hole; a cylindrical head arranged partly inside said casing and protruding through the hole in said end wall thereof, said cylindrical head receiving the effort of an external force; a cylinder arranged in said casing and containing a fluid; a piston arranged in said cylinder so as to cooperate therewith; first resilient means arranged between said cylindrical head and said piston and transferring the external force from said cylindrical head to said piston so that the same carries out a forward stroke and compresses during at least part of the same the fluid in said cylinder so that the latter has a braking effect on said piston; a hollow piston rod rigidly connected to said piston; a sleeve surrounding part of said piston rod in a fluid-tight manner; a groove provided in said piston rod and extending longitudinally thereof, said groove having a length exceeding the length of said sleeve, said groove communicating with the interior of said cylinder in all positions of said piston and terminating against the inner walls of said sleeve except in the last part of the forward stroke of said piston so as to relieve the pressure of the fluid in said cylinder and to cause the braking effect of the fluid on said piston to end; an element acted upon by said piston rod after the relief of the pressure of the fluid in said cylinder and the end of the braking effect of the same on said piston so as to transfer to said element at least part of the effort of the external force driving said piston with a delay caused by the braking effect of the fluid on said piston; a solid rod slidingly arranged in said hollow piston rod, said solid rod having a longitudinal groove; and resilient means arranged in said longitudinal groove and abutting against said casing so as to lock said solid rod against movement; said resilient means being pressed by said hollow piston rod in the last part of the forward stroke of said piston into said longitudinal groove of said solid rod so as to unlock the same, said solid rod being rigidly connected to said element.

24. A device for transferring a force, comprising, in combination, a casing having an end wall provided with a hole; a cylindrical head arranged partly inside said casing and protruding through the hole in said end wall thereof, said cylindrical head receiving the effort of an external force; a cylinder arranged in said casing and containing a fluid; a piston arranged in said cylinder so as to cooperate therewith; first resilient means arranged between said cylindrical head and said piston and transferring the external force from said cylindrical head to said piston so that the same carries out a forward stroke and compresses during at least part of the same the fluid in said cylinder so that the latter has a braking effect on said piston; a hollow piston rod rigidly connected to said piston; a sleeve surrounding part of said piston rod in a fluid-tight manner; a groove provided in said piston rod and extending longitudinally thereof, said groove having a length exceeding the length of said sleeve, said groove communicating with the interior of said cylinder in all positions of said piston and terminating against the inner walls of said sleeve except in the last part of the forward stroke of said piston so as to relieve the pressure of the fluid in said cylinder and to cause the braking effect of the fluid on said piston to end; a solid rod extending into said hollow piston rod so that the same can carry out a sliding movement with respect to each other, said solid rod having a longitudinal groove; and a resilient rod secured with one end thereof in said longitudinal groove and protruding with the other end thereof from said longitudinal groove so as to be engaged by said casing thereby locking said solid rod against movement, said resilient rod being pressed by said hollow piston rod in the last part of the forward stroke of said piston into said longitudinal groove of said solid rod so as to unlock the same, whereby said solid rod is subjected to at least part of the effort of the external force driving said piston.

25. A device for transferring a force, comprising, in combination, a casing having an end wall provided with a hole; a cylindrical head arranged partly inside said casing and protruding through the hole in said end wall thereof, said cylindrical head receiving the effort of an external force; a cylinder arranged in said casing and containing a fluid; a piston arranged in said cylinder so as to cooperate therewith; first resilient means arranged between said cylindrical head and said piston and transferring the external force from said cylindrical head to said piston so that the same carries out a forward stroke and compresses during at least part of the same the fluid in said cylinder so that the latter has a braking effect on said piston; a hollow piston rod rigidly connected to said piston; a sleeve surrounding part of said piston rod in a fluid-tight manner; a groove provided in said piston rod and extending longitudinally thereof, said groove having a length exceeding the length of said sleeve, said groove communicating with the interior of said cylinder in all positions of said piston and terminating against the inner walls of said sleeve except in the last part of the forward stroke of said piston so as to relieve the pressure of the fluid in said cylinder and to cause the braking effect of the fluid on said piston to end; a solid rod extending into said hollow piston rod so that the same can carry out a sliding movement with respect to each other other; an extension rigidly secured to said cylindrical head and extending into said hollow piston rod; resilient means arranged in said hollow piston rod between said extension and said solid rod so as to urge said solid rod into one end position thereof, said solid rod having a longitudinal groove; and a resilient rod secured with one end thereof in said longitudinal groove and protruding with the other end thereof from said longitudinal groove so as to be engaged by said casing thereby locking said solid rod against movement, said resilient rod being pressed by said hollow piston rod in the last part of the forward stroke of said piston into said longitudinal groove of said solid rod so as to unlock the same, whereby said solid rod is subjected to at least part of the effort of the external force driving said piston.

26. A device for transferring a force, comprising, in combination, a casing having two end walls each provided with a hole; a cylindrical head arranged partly inside said casing and protruding through the hole in one of said end walls thereof, said cylindrical head receiving the effort of an external force; a cylinder arranged in said casing and containing a fluid; a piston arranged in said cylinder so as to cooperate therewith; first resilient means arranged between said cylindrical head and said piston and transferring the external force from said cylindrical head to said piston so that the same carries out a forward stroke and compresses during at least part of the same the fluid in said cylinder so that the latter has a braking effect on said piston; a hollow piston rod rigidly connected to said piston; a sleeve surrounding part of said piston rod in a fluid-tight manner; a groove provided in said piston rod and extending longitudinally thereof, said groove having a length exceeding the length of said sleeve, said groove communicating with the interior of said cylinder in all positions of said piston and terminating against the inner walls of said sleeve except in the last part of the forward stroke of said piston so as to relieve the pressure of the fluid in said cylinder and to cause the braking effect of the fluid on said piston to end; a solid rod extending through the hole in the other of said end walls of said casing into said hollow piston rod so that the same can carry out a sliding movement with respect to each other; means shiftably arranged inside said casing near said other of said end walls thereof, said shiftably arranged means surrounding said solid rod; resilient means inserted between said other end wall of said casing and said shiftably arranged means so as to hold the same in one end position thereof; and means cooperating with said shiftably arranged means for locking said solid rod against movement, said shiftably arranged means being shifted into the other end position thereof by said hollow piston rod during the last part of the forward stroke of said piston, whereby said solid rod is unlocked and subjected to at least part of the effort of the external force driving said piston.

27. A device for transferring a force, comprising, in combination, a casing having two end walls each provided with a hole; a cylindrical head arranged partly inside said casing and protruding through the hole in one of said end walls thereof, said cylindrical head receiving the effort of an external force; a cylinder arranged in said casing and containing a fluid; a piston arranged in said cylinder so as to cooperate therewith; first resilient means arranged between said cylindrical head and said piston and transferring the external force from said cylindrical head to said piston so that the same carries out a forward stroke and compresses during at least part of the same the fluid in said cylinder so that the latter has a braking effect on said piston; a hollow piston rod rigidly connected to said piston; a sleeve surrounding part of said piston rod in a fluid-tight manner; a groove provided in said piston rod and extending longitudinally thereof, said groove having a length exceeding the length of said sleeve, said groove communicating with the interior of said cylinder in all positions of said piston and terminating against the inner walls of said sleeve except in the last part of the forward stroke of said piston so as to relieve the pressure of the fluid in said cylinder and to cause the braking effect of the fluid on said piston to end; a solid rod extending through the hole in the other of said end walls of said casing into said hollow piston rod so that the same can carry out a sliding movement with respect to each other; an extension rigidly secured to said cylindrical head and extending into said hollow piston rod; second resilient means arranged in said hollow piston rod between said extension and solid rod so as to urge said solid rod into one end position thereof; means shiftably arranged inside said casing near said other of said end walls thereof, said shiftable means surrounding said solid rod; third resilient means inserted between said other end wall of said casing and said shiftably arranged means so as to hold the same in one end position thereof; and means cooperating with said shiftably arranged means for locking said solid rod against movement, said shiftably arranged means being shifted into the other end position thereof by said hollow piston rod during the last part of the forward stroke of said piston, whereby said solid rod is unlocked and subjected to at least part of the effort of the external force driving said piston.

28. A device for transferring a force, comprising, in combination, a casing having two end walls each provided with a hole; a cylindrical head arranged partly inside said casing and protruding through the hole in one of said end walls thereof, said cylindrical head receiving the effort of an external force; a cylinder arranged in said casing and containing a fluid; a piston arranged in said cylinder so as to cooperate therewith; first resilient means arranged between said cylindrical head and said piston and transferring the external force from said cylindrical head to said piston so that the same carries out a forward stroke and compresses during at least part of the same the fluid in said cylinder so that the latter has a braking effect on said piston; a hollow piston rod rigidly connected to said piston; a sleeve surrounding part of said piston rod in a fluid-tight manner; a groove provided in said piston rod and extending longitudinally thereof, said groove having a length exceeding the length of said sleeve, said groove communicating with the interior of said cylinder in all positions of said piston and terminating against the inner walls of said sleeve except in the last part of the forward stroke of said piston so as to relieve the pressure of the fluid in said cylinder and to cause the braking effect of the fluid on said piston to end; a solid rod extending through the hole in the other of said end walls of said casing into said hollow piston rod so that the same can carry out a sliding movement with respect to each other; a ring shiftably arranged inside said casing near said other of said end walls thereof, said ring surrounding said solid rod; resilient means inserted between said other end wall of said casing and said ring so as to hold the same in one end position thereof; and means cooperating with said ring for locking said solid rod against movement, said ring being shifted into the other end position thereof by said hollow piston rod during the last part of the forward stroke of said piston, whereby said solid rod is unlocked and subjected to at least part of the effort of the external force driving said piston.

29. A device for transferring a force, comprising, in combination, a casing having two end walls each provided with a hole; a cylindrical head arranged partly inside said casing and protruding through the hole in one of said end walls thereof, said cylindrical head receiving the effort of an external force; a cylinder arranged in said casing and containing a fluid; a piston arranged in said cylinder so as to cooperate therewith; first resilient means arranged between said cylindrical head and said piston and transferring the external force from said cylindrical head to said piston so that the same carries out a forward stroke and compresses during at least part of the same the fluid in said cylinder so that the latter has a braking effect on said piston; a hollow piston rod rigidly connected to said piston; a sleeve surrounding part of said piston rod in a fluid-tight manner; a groove provided in said piston rod and extending longitudinally thereof, said groove having a length exceeding the length of said sleeve, said groove communicating with the interior of said cylinder in all positions of said piston and terminating against the inner walls of said sleeve except in the last part of the forward stroke of said piston so as to relieve the pressure of the fluid in said cylinder and to cause the braking effect of the fluid on said piston to end; a solid rod extending through the hole in the other of said end walls of said casing into said hollow piston rod so that the same can carry out a sliding movement with respect to each other; a ring shiftably arranged inside said casing near said other of said end walls thereof, said ring surrounding said solid rod; resilient means inserted between said other end wall of said casing and said ring so as to hold the same in one end position thereof; a recess in the curved wall of said solid rod, said recess being arranged opposite to said shiftable ring in said one end position thereof; and a ball inserted into said recess of said solid rod and held in locking position by said shiftable ring in said one end position thereof, said ring being shifted into the other end position thereof by said hollow piston rod during the last part of the forward stroke of said piston whereby said ball leaves said recess in said curved wall of said solid rod and unlocks the same so that said solid rod is subjected to at least part of the effort of the external force driving said piston.

30. A device for transferring a force, comprising, in combination, a casing having two end walls each provided with a hole; a cylindrical head arranged partly inside said casing and protruding through the hole in one of said end walls thereof, said cylindrical head receiving the effort of an external force; a cylinder arranged in said casing and containing a fluid; a piston arranged in said cylinder so as to cooperate therewith; first resilient means arranged between said cylindrical head and said piston and transferring the external force from said cylindrical head to said piston so that the same carries out a forward stroke and compresses during at least part of the same the fluid in said cylinder so that the latter has a braking effect on said piston; a hollow piston rod rigidly connected to said piston; a sleeve surrounding part of said piston rod in a fluid-tight manner; a groove provided in said piston rod and extending longitudinally thereof, said groove having a length exceeding the length of said sleeve, said groove communicating with the interior of said cylinder in all positions of said piston and terminating against the inner walls of said sleeve except in the last part of the forward stroke of said piston so as to relieve the pressure of the fluid in said cylinder and to cause the braking effect of the fluid on said piston to end; a solid rod extending through the hole in the other of said end walls of said casing into said hollow piston rod so that the same can carry out a sliding movement with respect to each other; a ring-shaped body shiftably arranged inside said casing near said other of said end walls thereof, said ring-shaped body having two flanges surrounding said solid rod, said two flanges limiting a hollow chamber; resilient means inserted between said other end wall of said casing and said one of said flanges of said ring-shaped body so as to hold the same in one end position thereof; a recess in the curved wall of said solid rod, said recess being arranged opposite to the other of said flanges of said shiftable ring-shaped body in said one end position thereof; and a ball inserted into said recess of said solid rod and held in locking position by said shiftable ring-shaped body in said one end position thereof, said ring-shaped body being shifted into the other end position thereof by said hollow piston rod during the last part of the forward stroke of said piston whereby said ball leaves said recess in said curved wall of said solid rod and enters said hollow chamber between said two flanges of said ring-shaped body so as to unlock said solid rod so that said solid rod is subjected to at least part of the effort of the external force driving said piston.

31. A device for transferring a force, comprising, in combination, a casing having two end walls each provided with a hole; a cylindrical head arranged partly inside said casing and protruding through the hole in one of said end walls thereof, said cylindrical head receiving the effort of an external force; a cylinder arranged in said casing and containing a fluid; a piston arranged in said cylinder so as to cooperate therewith; first resilient means arranged between said cylindrical head and said piston and transferring the external force from said cylindrical head to said piston so that the same carries out a forward stroke and compresses during at least part of the same the fluid in said cylinder so that the latter has a braking effect on said piston; a hollow piston rod rigidly connected to said piston; a sleeve surrounding part of said piston rod in a fluid-tight manner; a groove provided in said piston rod and extending longitudinally thereof, said groove having a length exceeding the length of said sleeve, said groove communicating with the interior of said cylinder in all positions of said piston and terminating against the inner walls of said sleeve except in the last part of the forward stroke of said piston so as to relieve the pressure of the fluid in said cylinder and to cause the braking effect of the fluid on said piston to end; a solid rod extending through the hole in the other of said end walls of said casing into said hollow piston rod so that the same can carry out a sliding movement with respect to each other; an extension rigidly secured to said cylindrical head and extending into said hollow piston rod; second resilient means arranged in said hollow piston rod between said extension and solid rod so as to urge said solid rod into one end position thereof; a ring shiftably arranged inside said casing near said other of said end walls thereof, said ring surrounding said solid rod; resilient means inserted between said other end wall of said casing and said ring so as to hold the same in one end position thereof; and means cooperating with said ring for locking said solid rod against movement, said ring being shifted into the other end position thereof by said hollow piston rod during the last part of the forward stroke of said piston, whereby said solid rod is unlocked and subjected to at least part of the effort of the external force driving said piston.

32. A device for transferring a force, comprising, in combination, a casing having two end walls each provided with a hole; a cylindrical head arranged partly inside said casing and protruding through the hole in one of said end walls thereof, said cylindrical head receiving the effort of an external force; a cylinder arranged in said casing and containing a fluid; a piston arranged in said cylinder so as to cooperate therewith; first resilient means arranged between said cylindrical head and said piston and transferring the external force from said cylindrical head to said piston so that the same carries out a forward stroke and compresses during at least part of the same the fluid in said cylinder so that the latter has a braking effect on said piston; a hollow piston rod rigidly connected to said piston; a sleeve surrounding part of said piston rod in a fluid-tight manner; a groove provided in said piston rod and extending longitudinally thereof, said groove having a length exceeding the length of said sleeve, said groove communicating with the interior of said cylinder in all positions of said piston and terminating against the inner walls of said sleeve except in the last part of the forward stroke of said piston so as to relieve the pressure of the fluid in said cylinder and to cause the braking effect of the fluid on said piston to end; a solid rod extending through the hole in the other of said end walls of said casing into said hollow piston rod so that the same can carry out a sliding movement with respect to each other; an extension rigidly secured to said cylindrical head and extending into said hollow piston rod; second resilient means arranged in said hollow piston rod between said extension and solid rod so as to urge said solid rod into one end position thereof; a ring-shaped body shiftably arranged inside said casing near said other of said end walls thereof, said ring-shaped body having two flanges surrounding said solid rod, said two flanges limiting a hollow chamber; resilient means inserted between said other end wall of said casing and one of said flanges of said ring-shaped body so as to hold the same in one end position thereof; a recess in the curved wall of said solid rod, said recess being arranged opposite to the other of said flanges of said shiftable ring-shaped body in said one end position thereof; and a ball inserted into said recess of said solid rod and held in locking position by said shiftable ring-shaped body in said one end position thereof, said ring-shaped body being shifted into the other end position thereof by said hollow piston rod during the last part of the forward stroke of said piston whereby said ball leaves said recess in said curved wall of said solid rod and enters said hollow chamber between said two flanges of said ring-shaped body so as to unlock said solid rod so that said solid rod is subjected to at least part of the effort of the external force driving said piston.

33. A device for transferring a force, comprising, in combination, a cylinder containing a fluid; a piston arranged in said cylinder so as to cooperate therewith; resilient means acting upon said piston so as to drive the same by an external force so as to carry out a forward stroke and to compress during at least part of the same the fluid in said cylinder so that the latter has a braking effect on said piston; means operative in the last part of the forward stroke of said piston for relieving the pressure of the fluid in said cylinder, said pressure relieving means causing the braking effect of the fluid on said piston to end; an element acted upon by one of said cylinder and said piston after the relief of the pressure of the fluid in said cylinder and the end of the braking effect of the same on said piston so as to transfer to said element at least part of the effort of the external force driving said piston with a delay caused by the braking effect of the fluid on said piston, said resilient means imparting to said piston a sudden impulse after the relief of the pressure of the fluid in said cylinder; and a member temporarily locking said element, said member being released by said piston being imparted the sudden impulse.

References Cited in the file of this patent

UNITED STATES PATENTS

| Number | Name | Date |
|---|---|---|
| 1,059,013 | Urquhart | Apr. 15, 1913 |
| 1,702,675 | Ventura | Feb. 19, 1929 |
| 2,298,208 | Gilbert et al. | Oct. 6, 1942 |
| 2,443,730 | Gruss | June 22, 1948 |
| 2,566,736 | Levy | Sept. 4, 1951 |
| 2,647,412 | Warmoes et al. | Aug. 4, 1953 |

FOREIGN PATENTS

| Number | Country | Date |
|---|---|---|
| 542,382 | France | May 16, 1922 |
| 628,941 | Great Britain | Sept. 7, 1941 |